Figure 1:
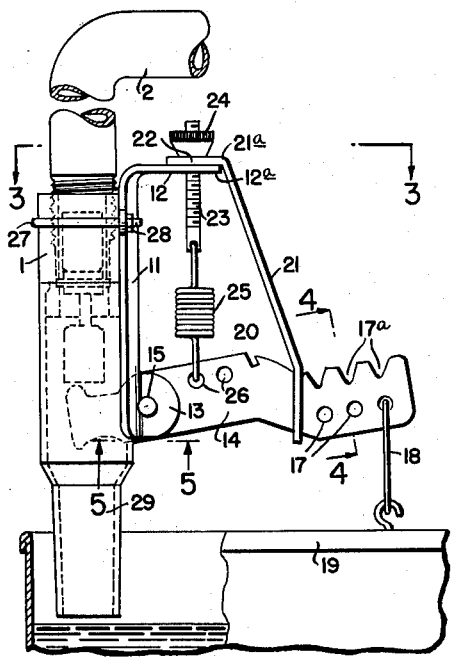

March 7, 1961 R. E. WITHAM 2,973,775
WATERING VALVE WITH SPRING OPERATED LATCH
Filed Feb. 18, 1954 2 Sheets-Sheet 1

INVENTOR
Robert E. Witham

BY Stone, Boyden & Mack

ATTORNEYS

March 7, 1961 R. E. WITHAM 2,973,775
WATERING VALVE WITH SPRING OPERATED LATCH
Filed Feb. 18, 1954 2 Sheets-Sheet 2

INVENTOR
Robert E. Witham

BY Stone, Boyden & Mack,
ATTORNEYS

United States Patent Office 2,973,775
Patented Mar. 7, 1961

2,973,775

WATERING VALVE WITH SPRING OPERATED LATCH

Robert E. Witham, Upper Darby, Pa., assignor to Fox Products Company, Philadelphia, Pa., a corporation of Pennsylvania Filed Feb. 18, 1954, Ser. No. 411,051

8 Claims. (Cl. 137—408)

This invention relates to automatic valve mechanism for suppling water to poultry and the like, and more particularly, to mechanism including a reciprocatory valve member the position of which is governed by the amount of water in a receptacle such as a drinking trough.

Although not limited to any specific construction or arrangement of the valve itself, the invention will be described by way of example, as employing a well known type of valve common in this art, namely a double acting valve capable of occupying two extreme positions, in both of which the water is shut off, and an intermediate position permitting free flow of water.

In valve devices of this character the velve is held in one of its closed positions by the water pressure, and is automatically moved to its other closed position by the weight of water in the trough into which the water flows, when sufficient water has accumulated in the trough. As the water is consumed and the weight of the water in the trough is reduced, the valve device opens to deliver more water, thus automatically maintaining an adequate supply at all times.

This automatic operation is usually produced by a spring which supports the trough, the weight of water in the trough serving to close the valve device against the tension of this spring when sufficient water has accumulated, and the spring, in turn, serving to open the valve device when the amount of water in the trough falls below a predetermined minimum.

As water accumulates in the trough and its weight becomes progressively greater, the valve device is slowly moved toward closed position, and the flow of water gradually reduced, little by little. As the valve approaches its final position the flow is throttled down, first to a very small trickle, and then to a mere drop-by-drop discharge. This is objectionable since it is difficult to construct a valve which will, under these circumstances, ever close tightly, and it frequently happens that water will continue to drool indefinitely, after the valve has reached its final closed position.

It is an object of the present invention, therefore, to devise means whereby the last part of the movement of the valve toward final extreme position will take place quickly, and the valve will close with a snap action, thus effectively and completely shutting off the water and preventing continued drooling or dripping. This is accomplished by suddenly reducing the tension of the spring when a predetermined amount of water has accumulated in the trough.

Since it has been the usual practice to so construct the trough or receptacle that its weight, when empty, is insufficient to overcome the tension of the spring and open the valve, it has been common to provide a manually settable latch for temporarily locking the valve control mechanism in open position, when it is desired to start water flowing into the trough. The arrangement is such that this latch is released and automatically moved to inoperative position when a sufficient amount of water has accumulated in the trough to overcome the tension of the spring.

It has heretofore been proposed to have such a latch return to inoperative position by gravity, but this has sometimes proven unsatisfactory because of sticking of the latch due to accumulation of dirt or ice.

Another object of the present invention is to provide improved resilient means for positively moving the latch to inoperative position when released.

Still another object is to devise means whereby the same spring which controls the movement of the valve may also be used to positively move the latch, thus enabling a single spring to perform both functions.

Figure 2:
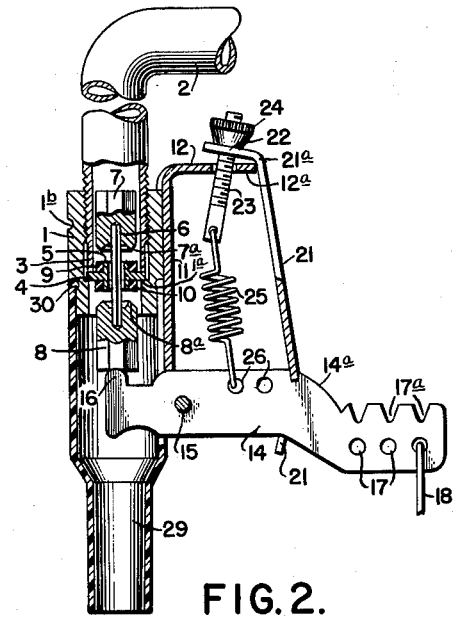
Figure 3:
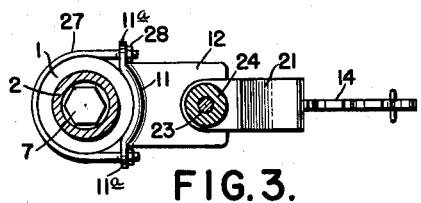
Figure 4:
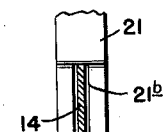
Figure 5:
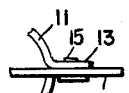
Figure 8:
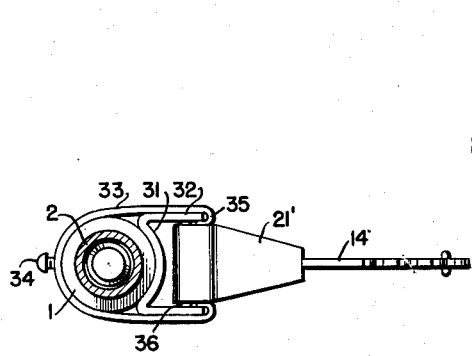
Figure 6:
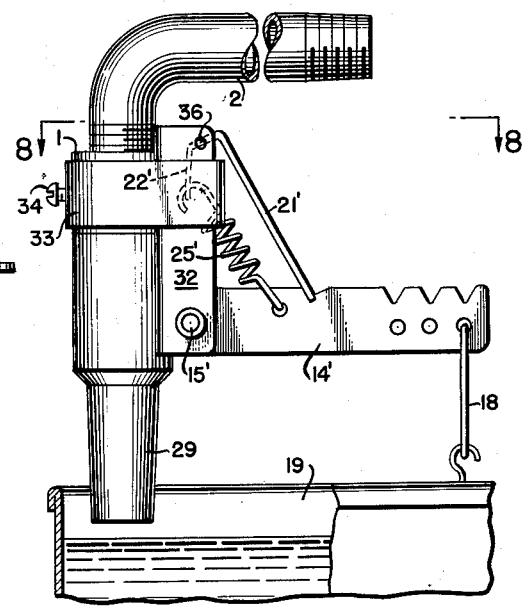
Figure 7:
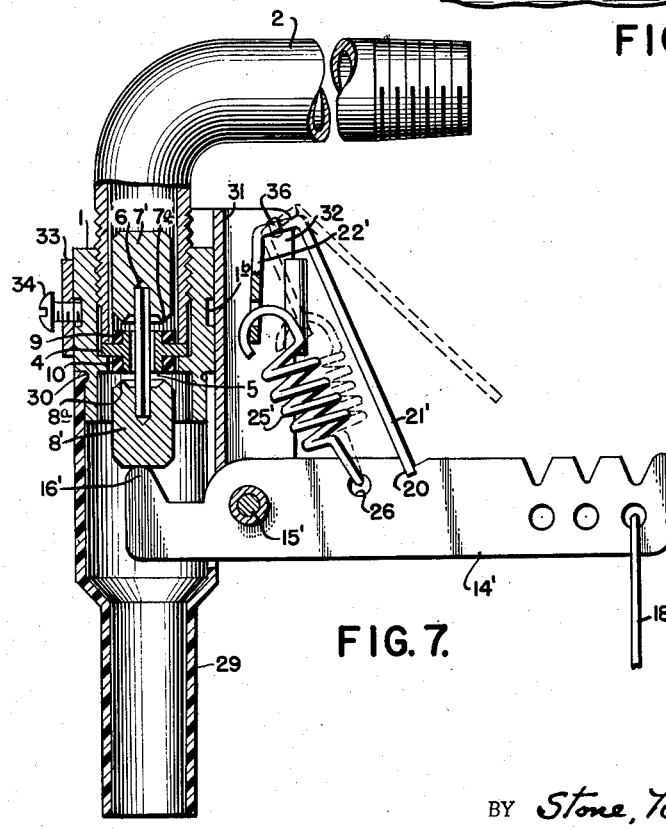

In order that the invention may be readily understood reference is had to the accompanying drawings forming part of this specification and in which:

Fig. 1 is a side elevation of one form of the invention parts being broken away, Fig. 2 is a vertical central section through the same, parts being in elevation, and some of the parts being shown in a position different from that of Fig. 1, Fig. 3 is an horizontal section of the line 3—3 of Fig. 1, Fig. 4 is a section substantially on the line 4—4 of Fig. 1 looking in the direction of the arrows, Fig. 5 is a fragmentary transverse section substantially on the line 5—5 of Fig. 1 looking in the direction of the arrows, Fig. 6 is a side elevation similar to Fig. 1 but showing a modified construction, Fig. 7 is a vertical central section on an enlarged scale through the device shown in Fig. 6, parts being in elevation and a different position of some of the parts being shown in dotted lines, and Fig. 8 is an horizontal section substantially on the line 8—8 of Fig. 6 looking in the direction of the arrows.

Referring to the drawings in detail and more particularly first to Figs. 1 to 5 inclusive, my improved valve device comprises a vertically extending body or housing 1 into the upper end of which is screwed one end of a water supply pipe 2.

The reciprocating valve itself may assume any suitable desired form, and constitutes no part of the present invention. In the embodiment illustrated in the drawing, the interior of the housing 1 below the screw threads is somewhat enlarged along its middle portion so as to form an annular shoulder 1a, on which rests a metal disc 4. The lower end of the pipe nipple 2 is cut to reduced thickness to form a skirt 3, which, when the pipe 2 is screwed into the housing, bears upon the top of the disc 4 and clamps it firmly against the shoulder 1a. The disc 4 has a sleeve 5 formed integral therewith and a valve stem 6 slides freely through this sleeve with a loose fit. Secured to the stem 6 are valve members 7 and 8, in the nature of relatively heavy blocks, the lower end of the block 7 being cut to form an annular ridge 7a and the upper end of the block 8 being cut to form an annular ridge 8a. These ridges are adapted to engage annular valve seats 9 and 10 of relatively soft material, mounted on the upper and lower sides of the disc 4, respectively, and surrounding the sleeve 5.

Thus, when either ridge 7a or 8a, is in an engagement with its seat 9 or 10, the valve is closed so that no water can flow. When, however, the assembly 6, 7 and 8 is stopped in an intermediate position with neither ridge in close engagement with its seat, then the valve is open and water may flow down past the block 7 and pass through the space between the stem 6 and sleeve 5.

Rigidly secured to the body or housing 1 is a fixed support 11. This is in the nature of an elongated curved plate, secured to the body by means of an encircling band 27, the ends of which pass through openings in lugs 11a projecting from the sides of the plate 11 and are secured by nuts 28 as best shown in Fig. 3. The body or housing 1 preferably has annular groove 1b to receive the band 27.

The upper end of the plate 11 is bent over as to extend horizontally as indicated at 12, and at its lower end a portion of the plate is bent up laterally to form an ear 13. To this ear is pivotally secured as by a pin 15, a control lever 14, the inner end 16 of which is positioned to bear against the lower end of the block 8 as clearly shown in Fig. 2.

The lever 14 is disposed at substantial right angles to the housing 1 and extends generally horizontally. It is provided at its outer end with a series of holes 17 through a selected one of which passes a rod or wire 18, from which the trough 19 or other receptacle is suspended as shown in Fig. 1. Instead of using the holes 17, the rod or wire 18 may engage any one of a series of notches 17a formed in the upper edge of the lever.

The upper edge of the arm or lever 14 is provided with a notch 20 adapted to engage the lower end of a latch 21, which lower end preferably is formed with a slot 21b adapted to straddle the lever 14 as best shown in Fig. 4.

The upper end of the latch member 21 is bent over as indicated at 21a in Fig. 2 so that the end portion 22 thereof extends at a sharp angle to the main body of the latch. This extended portion 22 has an opening through which, and a corresponding opening in the arm 12, extends a threaded stem 23 on the upper end of which works a nut 24 by means of which it may be adjusted.

A tension spring 25 is connected between the lower end of the stem 23 and an opening 26 in the arm or lever 14, and it will be noted that the tension of this spring causes the nut 24 to bear snugly against the extended portion 22 of the latch. The forward edge 12a of the arm 12 constitutes a fulcrum or pivot point for the latch, and the latch can swing about this fulcrum from the position shown in Fig. 1 to that shown in Fig. 2.

In order to guide and direct the stream of water issuing from the valve and to prevent splashing, I preferably employ a delivery tube 29 frictionally secured to the lower end of the housing 1 as by means of a bead 30 snapping into a groove in the housing. It will of course be understood that this delivery tube has a slot or opening in its side through which the arm 14 extends.

The operation of this form of invention is as follows. When the empty trough 19 is hung on the wire 18 its weight is insufficient to overcome the tension of the spring 25 and the arm 14 will, therefore, remain substantially in the position in Fig. 1, in which the valve is held closed by the pressure of the water against the upper valve member and the weight of the blocks 7 and 8. When it is desired to start water running into the trough, the lever 14 is swung downwardly by hand into the position shown in Fig. 2 and the latch is then swung inwardly so as to engage the notch 20 and thus lock the lever temporarily in valve opening position as shown in Fig. 2.

It will be noted that when the latch is moved to this position the upper end 22 thereof is tilted, thus also tilting the stem 23 an an angular position and thus increasing the tension on the spring 25.

The nut 24 is adjusted so that the tension of the spring 25 will be overcome by the weight of water accumulating in the trough when a sufficient amount has accumulated. When this happens and the lever 14 moves slightly downward under the influence of the weight of the water in the trough, the lower end of the latch 21 is disengaged from the notch 20. Thereupon the tension of the spring 25, bearing upon the extension 22, serves to swing or kick the latch out to the position shown in Fig. 1, thus releasing the arm 14 so that it is free to rise and fall as required. This the latch is resiliently biased outwardly away from the housing 1 and when disengaged is positively thrown to inoperative position by the force of the spring and it will be noted that this is the same spring that controls the arm 14. The result is brought about by the fact that the spring is connected between the lever 14 and the end of the latch which is extended beyond its pivot point.

It will be further noted that when the latch is kicked out and swings to the position shown in Fig. 1, the extended end moves down into flat contact with the support 12, thus suddenly shortening the distance between the two ends of the tension spring 25 and therefore reducing the tension in this spring. Reduction of the tension, or, in other words, the weakening of the spring, permits the arm 14 to move further down, under the influence of the weight of the water in the trough. In fact, this arm drops suddenly and the inner end 16 therefore jams the lower valve member 8 firmly against its seat 10, thus abruptly cutting off the flow of water.

It will therefore be seen that by the provision of means for suddenly reducing the tension of the spring, the valve is caused to close with a snap action and all tendency to drool or drip is eliminated.

Referring now to Figs. 6, 7 and 8, I have shown a slightly modified construction, but in these figures the same parts are designated by similar reference characters as in Figs. 1 to 5. A detailed description of these parts seem unnecessary.

Instead of the type of fixed support 11 shown in Figs. 1 and 2, I provide in Figs 6, 7 and 8 a modified support 31 which is of channel shape having side flanges 32, between which side flanges a pivot pin 15' passes to support the control lever 14'. The support 31 is shown as secured to the housing 1 by means of a U-shaped clip 33 which embraces the housing and which has its ends 35 folded over to engage the edges of the flanges 32 as best shown in Fig. 8. A set screw 34 working in an annular groove 1b of the housing serves to hold the assembly in position.

A modified form of latch member 21' is illustrated and this is pivotally mounted on pintles or trunnions 36 journalled in the flanges 32. As in the first five figures this latch member 21' has its upper end extended beyond the pivot as shown at 22', which extended end is disposed at a sharp angle to the body of the latch. A tension spring 25' is connected as before between the lever arm 14' and the extended end 22' of the latch member.

From an inspection of Fig. 7, it will be noted that the construction is such that the point of attachment of the upper end of the spring to the extended end 22' of the latch is offset laterally from the line joining the pivot 36 with the point 26 at which the lower end of the spring is anchored to the arm 14'. Thus, as in Figs. 1 to 5, when the latch is resiliently biased outwardly, and when it is released by the weight of water in the trough, the tension of the spring swings the latch to inoperative position, as shown in dotted lines. The spring itself also moves over into dotted line position. In this position, the spring lies approximately on the line joining the points 26 and 36, and is thus substantially shorter than in its full line position.

In this modification, as before, the latch is positively disengaged by the same spring which controls the lever 14'. In this modification, also, as in the first, the spring is suddenly shortened, and its tension thus substantially reduced, when the latch is disengaged, and this reduction of the tension permits the arm 14' to move further down, under the influence of the weight of water in the trough. In fact, this arm drops suddenly down, as already described in connection with Fig. 1, thus forcing the lower valve member 8' firmly against its seat, and abruptly and definitely cutting off the flow of water.

What I claim is:

1. In combination, a receptacle such as a watering trough, a valve housing adapted to be connected to a source of water under pressure, valve means in said housing for governing the flow of water from said source to said receptacle, said valve means being movable to either one of two extreme closed positions in which flow of water is cut off, and to an intermediate open position in which flow of water is permitted, a valve control lever operatively associated with said valve means and with said receptacle, said valve control lever normally occupying a position enabling said valve means to move to one extreme closed position under the influence of pressure from said source of water, said lever being movable by hand to shift said valve means to its intermediate open position, a support rigid with said housing, a latch member pivoted near one end on said support and manually shiftable to operative position for temporarily locking said lever in such valve opening position, and a tension spring connected between said latch member and said lever in such manner that it serves to bias said lever to normal position and to sustain the weight of said receptacle, and also to swing said latch member to inoperative position when released, the weight of water in said receptacle, as it accumulates, serving through said lever to gradually move said valve means toward the other extreme closed position, and, after a predetermined amount has accumulated therein, to release said latch member, whereby the tension on said spring is suddenly reduced when said latch member is released, and said valve means is caused to move abruptly to completely closed position.

2. In combination, a receptacle such as a watering trough, a valve housing adapted to be connected to a source of water under pressure, valve means in said housing for governing the flow of water from said source to said receptacle, said valve means being movable to either one of two extreme closed position in which flow of water is cut off, and to an intermediate open position in which flow of water is permitted, valve control means operatively associated with said valve means and with said receptacle, a tension spring biased said valve control means to a position to enable said valve means to move to one extreme closed position under the influence of pressure from said source of water, said valve control means being movable in response to the weight of water in said receptacle against the force of said spring to shift said valve means against the water pressure to its other extreme closed position, the weight of said receptacle, when empty, being insufficient to move said valve control means against the combined force of said spring and of the water pressure holding said valve means in its first mentioned extreme closed position, said valve control means being movable by hand to shift said valve means to its intermediate open position, and a latch device manually shiftable to operative position for temporarily locking said valve control means in such intermediate position against the tension of said spring while water flows into said receptacle, said latch device being constructed to return automatically to inoperative position when a predetermined amount of water has accumulated in said receptacle, and means including said latch device and responsive to the return of said latch device to inoperative position upon accumulation of sufficient water in said receptacle for suddenly shortening the distance between the two ends of said spring and thus reducing its tension, whereby said valve control means abruptly moves said valve means to said second said other extreme closed position.

3. In combination, a receptacle such as a watering trough, a valve housing adapted to be connected to a source of water under pressure, valve means in said housing for governing the flow of water from said source to said receptacle, said valve means being movable to either one of two extreme closed positions in which flow of water is cut off, and to an intermediate open position in which flow of water is permitted, valve control means operatively associated with said valve means and with said receptacle, a tension spring biasing said valve control means to a position to enable said valve means to move to one extreme closed position under the influence of pressure from said source of water, said valve control means being movable in response to the weight of water in said receptacle against the force of said spring to shift said valve means against the water pressure to its other extreme closed position, the weight of said receptacle, when empty, being insufficient to move said valve control means against the combined force of said spring and of the water pressure holding said valve means in its first mentioned extreme closed position, said valve control means being movable by hand to shift said valve means to its intermediate open position, and a latch device manually shiftable to operative position for temporarily locking said valve control means in such intermediate position against the tension of said spring while water flows into said receptacle, and means including said spring for returning said latch device automatically to inoperative position when a predetermined amount of water has accumulated in said receptacle, whereby the return of said latch device to inoperative position upon accumulation of sufficient water in said receptacle suddenly shortens the distance between the two ends of said spring and thus reduces its tension, and said valve control means abruptly moves said valve means to said second completely closed position.

4. In combination, an elongated, vertically disposed valve housing, valve means within said housing, a lever pivotally supported near one end on and projecting into said housing, said lever extending generally horizontally and being operatively associated with said valve means, a bracket secured to said housing at a point above said lever and having a portion projecting horizontally therefrom, said projecting portion having an opening therein, a manually shiftable latch member having an opening at one end adapted to register with the opening in said projecting portion, said latch member resting upon the projecting portion of said bracket, a threaded stem extending upwardly through the alined openings in said projecting portion and latch member, a nut working on said stem and bearing against said latch member, and a tension spring connected at one end with said lever and at the other end with said stem, said latch member terminating in a free lower end, and said lever being provided on its upper surface with a notch adapted to be engaged by the free lower end of said latch member to lock said lever in a position holding said valve means open.

5. In combination, a receptacle such as a watering trough, a valve housing adapted to be connected to a source of water under pressure, valve means in said housing for governing the flow of water from said source to said receptacle, a valve control lever operatively associated with said valve means and with said receptacle, said valve control lever being movable to either one of two extreme positions in both of which said valve means is closed, and to an intermediate position in which said valve means is open, said valve control lever normally occupying a position enabling said valve means to close under the influence of pressure from said source of water, said lever being movable by hand to its intermediate, valve opening position, a support rigid with said housing, a latch member pivoted near one end on said support and manually shiftable to operative position for temporarily locking said lever in such valve opening position, and a tension spring connected between said latch member and said lever in such manner that it serves to bias said lever to normal position and to sustain the weight of said receptacle, and also to swing said latch member to inoperative position when released, the weight of water in said receptacle, as it accumulates, serving to gradually move said lever toward its other extreme position in which said valve means is also closed, and after a predetermined amount has accumulated therein, to release said latch member, whereby the tension on said spring is suddenly reduced when said latch member is released, and said valve control lever is caused by the weight of water in said receptacle to move abruptly to its said extreme position in which said valve means is completely closed, said spring extending upwardly from said lever between said housing and said latch member.

6. In an automatic watering valve, the combination of an upright valve housing; valve means within said housing; a valve actuating member extending generally laterally of said housing and mounted for pivotal movement about a horizontal axis for movement between upper and lower extreme positions, said actuating member being operatively associated with said valve means and said valve means being closed when said actuating member is in either of said extreme positions and open when said actuating member is in an intermediate position between said extreme positions; rigid means fixed to said housing and projecting therefrom above the uppermost extreme position of said actuating member; a manually set, spring released latch member pivotally supported on said rigid means for movement in an upright plane, said latch member comprising a shorter arm and a longer arm, said arms being disposed in said plane but at an angle to each other with the angle opening toward said housing and the apex thereof being disposed at the axis of pivotal movement of the latch member, said shorter arm extending above said rigid means toward said housing, said longer arm extending from said rigid means downwardly toward said actuating member and terminating in a tip engageable with said actuating member to latch the same in intermediate, valve-opening position; and a tension spring having one end connected to said actuating member and its other end connected to said shorter arm of said latch member, said spring being disposed between said latch member and said housing and effective to bias said actuating member toward said upper extreme position and to bias said latch member pivotally in a direction to swing said longer arm away from said housing, said longer arm of said latch member having a surface facing away from said housing and being shiftable into latching engagement with said actuating member by manual application of pressure toward said housing against said surface.

7. A watering valve in accordance with claim 6 and wherein said actuating member is provided with an upwardly opening notch and the tip of said longer arm of said latch member is engageable in said notch.

8. A watering valve in accordance with claim 6 and wherein said rigid means is a bracket projecting laterally from said housing and terminating in a horizontal bearing edge and the portion of said latch member defined by the angular junction between said longer and shorter arms is pivotally engaged over said bearing edge.

References Cited in the file of this patent

UNITED STATES PATENTS

| | | |
|---|---|---|
| Re. 23,447 | Pruitt | Dec. 25, 1951 |
| 1,653,525 | White | Dec. 20, 1927 |
| 2,629,581 | Toadvine | Feb. 24, 1953 |